Sept. 24, 1940.    H. A. BEEKHUIS, JR    2,215,451
PROCESS FOR ABSORBING NITROSYL CHLORIDE
Filed June 23, 1938
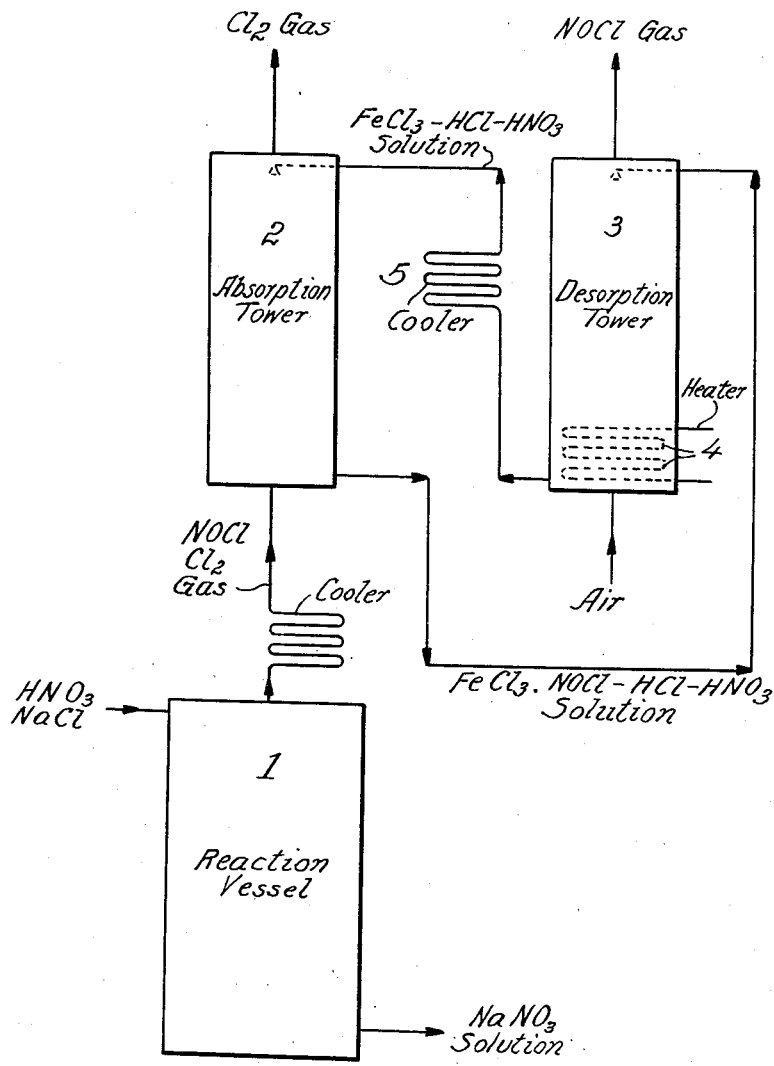
INVENTOR
Herman A. Beekhuis, Jr.
BY
Charles W. Brown
ATTORNEYS Patented Sept. 24, 1940

2,215,451

UNITED STATES PATENT OFFICE 2,215,451

PROCESS FOR ABSORBING NITROSYL CHLORIDE

Herman A. Beekhuis, Jr., Petersburg, Va., assignor to The Solvay Process Company, New York, N. Y., a corporation of New York Application June 23, 1938, Serial No. 215,352

9 Claims. (Cl. 23—157)

This invention relates to a process for the absorption of nitrosyl chloride, particularly for its absorption and removal from gases containing it. The process of this invention is particularly applicable to the treatment of the gaseous mixture containing about equal proportions of nitrosyl chloride and chlorine which is one of the products of the reaction of hot concentrated nitric acid with a metal chloride such as sodium, potassium or calcium chloride.

It is known that when nitrosyl chloride is passed in contact with metallic iron it reacts to form an addition compound of ferric chloride and nitrosyl chloride ($FeCl_3.NOCl$) with the evolution of nitric oxide. When this addition compound (ferric nitrosyl chloride) is dissolved in water, it goes into solution with the evolution of nitric oxide and the formation of ferric chloride.

It is also known that numerous other metals react with nitrosyl chloride similarly to iron. For example, zinc forms zinc nitrosyl chloride ($ZnCl_2.NOCl$), copper forms cupric nitrosyl chloride, tin forms stannic nitrosyl chloride, bismuth forms bismuth nitrosyl chloride, etc. Each of these addition compounds reacts with water to evolve nitric oxide and form the corresponding metal chloride.

It is also known that many solid, dry metal chlorides react directly with nitrosyl chloride to form the above addition compounds, compounds of the type metal chloride.XNOCl, in which one or more molecules of NOCl are combined with a molecule of the metal chloride. For example, ferric chloride forms ferric nitrosyl chloride; zinc chloride forms zinc nitrosyl chloride; cupric chloride forms cupric nitrosyl chloride; bismuth chloride forms bismuth nitrosyl chloride. All of these addition compounds are somewhat unstable and decompose, especially when warmed, to evolve nitrosyl chloride.

It is an object of this invention to provide a process whereby solutions of metal chlorides which form addition compounds with nitrosyl chloride may be employed as an absorption medium for nitrosyl chloride and particularly to separate the nitrosyl chloride from gases containing the same.

I have discovered that the addition compounds of metal chlorides and nitrosyl chloride are soluble in aqueous solutions containing hydrochloric and nitric acids and at ordinary temperatures are sufficiently stable in such solutions so that the solutions of metal chlorides have a sufficient absorption capacity for nitrosyl chloride as to render it practicable to use them as a means for removing nitrosyl chloride from a gas. I have discovered that when a gas containing nitrosyl chloride is contacted with an aqueous solution of one of these metal chlorides, which is acid with hydrochloric and nitric acids, the nitrosyl chloride is absorbed in the solution and the resulting solution upon being heated or contacted with an inert gas or both, gives up the absorbed nitrosyl chloride and may again be used for absorbing additional nitrosyl chloride.

The process of this invention, therefore, comprises contacting nitrosyl chloride with an aqueous solution of metal chloride which reacts with nitrosyl chloride to form an addition compound, the aqueous solution containing free hydrochloric and nitric acids to cause the nitrosyl chloride to form an addition compound with the metal chloride rather than being hydrolyzed by the water present to form nitric and hydrochloric acids and nitric oxide. If the solution initially introduced into contact with the nitrosyl chloride contains no acid, there will be some hydrolysis of nitrosyl chloride by the water in the solution to form nitric and hydrochloric acids and nitric oxide. The amount of reaction taking place, however, will be limited since the nitric and hydrochloric acids first formed will then act to prevent further hydrolysis of the nitrosyl chloride and the nitrosyl chloride will then be absorbed and react to form an addition compound with the metal chloride in the solution. It is preferred, however, to pass into contact with the nitrosyl chloride highly concentrated solutions of the metal chlorides which contain sufficient free hydrochloric and nitric acids to substantially prevent the hydrolysis of nitrosyl chloride to nitric oxide and nitric and hydrochloric acids. Thus, it is preferred to introduce into contact with the nitrosyl chloride a concentrated aqueous solution of the metal chloride containing free hydrochloric and nitric acids in which there are present more than 2.5 (and, preferably, more than 10) gram atoms of acidic hydrogen to every 100 gram mols of $H_2O$ and in which the number of gram atoms of chlorine (present as chloride) is greater than the number of gram radicals of nitrate. By a "gram radical of nitrate" I mean the weight in grams of nitrate radical ($NO_3$) divided by 62. The nitrosyl chloride gas may be contacted with the metal chloride solution at ordinary atmospheric temperatures or may be coooled to any temperature above the freezing point of the solution.

The process of this invention may be carried out by contacting the nitrosyl chloride with concentrated solutions of ferric chloride or zinc chloride containing about 50% to 75% of the metal chloride, the remainder being free hydrochloric and nitric acids and water in the proportions of about 4 parts or more hydrochloric acid and about 4 parts or more nitric acid for every 100 parts of water, preferably 2% to 5% HCl, 2% to 5% $HNO_3$ and 21% to 46% water. These preferred solutions will contain 34 to 185 gram atoms of acidic hydrogen to every 1000 gram mols of water. The amount of water in such solutions is sufficient to retain the metal chloride in solution at the temperatures preferred for absorbing the nitrosyl chloride. Further, while in some cases very highly concentrated solutions of the metal chlorides are viscous, these solutions contain enough water to render them sufficiently fluid to be circulated in contact with the nitrosyl chloride gas and they have a high capacity for absorption of nitrosyl chloride. Solutions of ferric chloride containing 70% to 75% $FeCl_3$, 2% HCl, 2% $HNO_3$ and 21% to 26% water are particularly advantageous for use in carrying out the process of this invention, since they are easily circulated in contact with the nitrosyl chloride. Zinc chloride solutions containing, for example, 75% to 80% $ZnCl_2$, 2% HCl, 2% $HNO_3$ and 16% to 21% water, may be employed, although less conveniently than the above ferric chloride solutions, since the zinc chloride solutions are more viscous.

Although the solutions specifically mentioned above are particularly suitable for absorption of nitrosyl chloride in accordance with this invention, from the viewpoint of the ease of operation and thoroughness of removal of nitrosyl chloride from the gas containing it, the invention is not limited to these solutions but any aqueous solution of a metal chloride salt which forms an addition compound with nitrosyl chloride and which solution contains sufficient hydrochloric and nitric acids to render it acidic in reaction may be employed. Thus, bismuth chloride solutions initially containing 75% to 80% $BiCl_3$, 5% hydrochloric acid and 15% to 20% water have been found to readily absorb nitrosyl chloride from a gas containing the same. Other metal chlorides whose aqueous solutions acidic with hydrochloric acid have been found to absorb nitrosyl chloride are stannic chloride, cupric chloride, and chromic chloride.

The solution of metal chloride-nitrosyl chloride addition compound may be heated or stripped by contact with an inert gas or both heated and stripped with an inert gas to recover the nitrosyl chloride absorbed in the solution and regenerate the metal chloride solution for again contacting it with nitrosyl chloride gas. The metal chloride solution may be recycled through two stages. In an absorption stage the solution is contacted with a gas containing nitrosyl chloride, preferably at a temperature below about 25° C., to absorb the nitrosyl chloride. In this step the solution and gas are passed in countercurrent flow with each other. The solution of addition compound of the salt and nitrosyl chloride may then be passed into a vessel in which it is warmed to a temperature above about 50° C. to evolve the absorbed nitrosyl chloride. To facilitate the evolution of the nitrosyl chloride the solution is both heated to above 50° C. and stripped, employing a gas inert towards the metal chloride such as oxygen, nitrogen or air, which serves to strip nitrosyl chloride from the solution. The resulting mixture of gas and nitrosyl chloride may be treated in any desired manner to recover the nitrosyl chloride from the gas, as for example by liquefaction or to oxidize the nitrosyl chloride by means of oxygen in air used for stripping it from the metal chloride-nitrosyl chloride solution. The metal chloride solution from which the nitrosyl chloride has been evolved may then be cooled and returned to the absorption step to absorb additional nitrosyl chloride.

The process of this invention is particularly advantageous as a means for separating nitrosyl chloride from a gas containing it mixed with chlorine, air, nitrogen or oxygen and containing no more than a small proportion of nitrogen dioxide to nitrosyl chloride since the presence of nitrogen dioxide in large quantities will result in its reaction with water present in the solution to form nitric acid. If the concentration of nitric acid in the solution thus becomes unduly high, the metal chloride will be decomposed and absorption of the nitrosyl chloride thus prevented.

The invention will be more particularly described in the following example, the process of which is illustrated in the accompanying drawing.

With reference to the drawing, the numeral 1 designates a reaction vessel in which sodium chloride and a concentrated aqueous solution of nitric acid are reacted to form a solution of sodium nitrate and to evolve a gas containing about equal molecular proportions of nitrosyl chloride and chlorine. The gas from vessel 1, after being cooled, is passed into the bottom of an absorption tower 2 through which the gas passes upwardly in contact with a descending flow of ferric chloride solution which is introduced to the top of the tower and flows downwardly to the bottom thereof. The solution introduced to the top of tower 2 may have the following composition:

| | Per cent |
|---|---|
| $FeCl_3$ | 70 |
| HCl | 6 |
| $H_2O$ | 24 |

It is introduced into the top of tower 2 at a temperature of about 25° C. In passing downwardly through tower 2 the solution of ferric chloride absorbs the nitrosyl chloride from the ascending gases and a substantially pure chlorine gas escapes from the top of the tower. A solution of ferric nitrosyl chloride containing hydrochloric and nitric acids is withdrawn from the bottom of tower 2 and is passed into the top of a desorption tower 3 and flows downwardly to the bottom of this tower. In tower 3 the ferric nitrosyl chloride solution is heated by means of a heater 4 in the bottom of the tower and is treated with air introduced at the bottom of the tower and passed upwardly therethrough in contact with the descending flow of solution. The solution is treated with the air at a temperature of about 50° C. in the top of the tower upwardly to about 75° C. in the bottom of the tower. Under the combined effects of the increased temperature and stripping by the air, the solution is substantially freed of nitrosyl chloride. The solution withdrawn from the bottom of tower 3, after being cooled to about 25° C. in cooler 5, is returned to the top of tower 2. The solution returned from tower 3 contains free nitric acid. As the amount of nitric acid in the circulated solution increases, the hydrolysis of nitrosyl chloride is decreased until substantially all of the nitrosyl chloride absorbed in tower 2 reacts with the metal chloride in the solution to form the addition compound. To the extent hydrolysis of the nitrosyl chloride takes place in tower 2, the reaction is reversed in tower 3, with the formation of nitrosyl chloride and chlorine. Accordingly, the gas escaping from the top of tower 3, in addition to containing nitrosyl chloride, may contain relatively small proportions of chlorine and it may also contain some hydrochloric acid. Under some conditions of operation of tower 3 it may be desirable to introduce hydrochloric acid into the solution returning to tower 2 to compensate for that evolved from the solution in tower 3.

Other solutions than ferric chloride solutions may be employed in the process of the above example for absorption of the nitrosyl chloride. For example, a solution of zinc chloride having the following composition may be introduced into the top of absorption tower 2 and contacted with the nitrosyl chloride gas in the tower at a temperature of about 25° C.:

| | Per cent |
|---|---|
| $ZnCl_2$ | 75 |
| HCl | 5 |
| $H_2O$ | 20 |

It is not necessary to heat the metal chloride-nitrosyl chloride solution in order to evolve from it nitrosyl chloride. Thus the solution from absorption tower 2 may be treated in tower 3 with an inert gas at the same temperature as is employed for the absorption of the nitrosyl chloride in tower 2. By passing the solution containing nitrosyl chloride in countercurrent flow with the inert gas the solution leaving the bottom of tower 3 will contain a small enough amount of residual nitrosyl chloride so that it may be employed in tower 2. Since the higher the temperature in the desorption of the nitrosyl chloride the less is the amount of inert gas required for stripping the solution, it is preferred to carry out the desorption of nitrosyl chloride at a higher temperature than is employed for absorbing the nitrosyl chloride.

In a process of the type of the above example for absorbing nitrosyl chloride, in which a solution of metal chloride is cycled through NOCl absorption and regeneration stages, it is not necessary to start with a solution containing hydrochloric acid. Instead, a solution of the metal salt in water may initially be contacted with the gas containing nitrosyl chloride. By reaction of the nitrosyl chloride with the water in the solution, nitric and hydrochloric acids are formed by one or the other of the following reactions:

(a) $NOCl + Cl_2 + 2H_2O = 3HCl + HNO_3$.
(b) $3NOCl + 2H_2O = 3HCl + HNO_3 + 2NO$.

In the cyclic absorption and desorption of the nitrosyl chloride, the amount of free acid and the ratio of chloride to nitrate in the solution soon approach equilibrium concentrations for the particular gas being treated and conditions under which the solution is contacted with the gas and treated to desorb the nitrosyl chloride. As the process continues to be operated the acids in the cycled solution will then substantially prevent reactions (a) and (b) continuing to take place and the nitrosyl chloride will then react with the metal chloride in the absorption step to form the addition compound, which will be decomposed in the desorption step. For example, in treating a gas containing about equal molecular proportions of nitrosyl chloride and chlorine by a cyclic process, the free acid in the solution will remain at about 2 to 3-normal with the free hydrochloric acid about 2-normal. As the ratio of chlorine to nitrosyl chloride in the gas decreases, the acidity of the solution will decrease and with low concentrations of chlorine in the gas the acidity of the solution may be 1-normal or less.

I claim:

1. In a process for absorption of nitrosyl chloride and reaction of the nitrosyl chloride with a metal chloride to form an addition compound, that improvement which comprises contacting the nitrosyl chloride with an acidic aqueous solution of a metal chloride which forms an addition compound with nitrosyl chloride, said solution containing sufficient free hydrochloric and nitric acids to substantially prevent hydrolysis of the nitrosyl chloride, thereby absorbing in said solution the nitrosyl chloride with the formation of an addition compound of the nitrosyl chloride and metal chloride.

2. The process for the absorption of nitrosyl chloride which comprises contacting said nitrosyl chloride with an aqueous solution of free hydrochloric and nitric acids and of a metal chloride which forms an addition compound with nitrosyl chloride, said solution containing more than 2.5 gram atoms of acidic hydrogen to every 100 gram mols of $H_2O$ and a number of gram atoms of chlorine (present as chloride) greater than the number of gram radicals of nitrate.

3. The process for the absorption of nitrosyl chloride which comprises contacting said nitrosyl chloride at about 25° C. or lower with a concentrated aqueous solution of a metal chloride which forms an addition compound with nitrosyl chloride containing free hydrochloric and nitric acids, said solution containing more than 10 gram atoms of acidic hydrogen to every 100 gram mols of $H_2O$ and a number of gram atoms of chlorine (present as chloride) greater than the number of gram radicals of nitrate.

4. In a process for absorption of nitrosyl chloride and reaction of the nitrosyl chloride with a metal chloride which forms an addition compound with the nitrosyl chloride, that improvement which comprises directly contacting the nitrosyl chloride with a solution containing about 50% to 75% of said metal chloride and free hydrochloric and nitric acids in the proportions of about 4 parts or more HCl and about 4 parts or more $HNO_3$ to every 100 parts of water, thereby absorbing in said solution the nitrosyl chloride with the formation of an addition compound of the nitrosyl chloride and metal chloride.

5. In a process for absorption of nitrosyl chloride and reaction of the nitrosyl chloride with a metal chloride to form an addition compound, that improvement which comprises contacting the nitrosyl chloride with an aqueous solution of ferric chloride containing about 70% to about 75% $FeCl_3$, about 2% HCl, about 2% $HNO_3$ and about 21% to about 26% water.

6. In a process for absorption of nitrosyl chloride and reaction of the nitrosyl chloride with a metal chloride to form an addition compound, that improvement which comprises contacting the nitrosyl chloride with an aqueous solution containing about 75% to about 80% $ZnCl_2$, about 2% HCl, about 2% $HNO_3$ and about 16% to about 21% water.

7. In a process for absorption of nitrosyl chloride and reaction of the nitrosyl chloride with a metal chloride which forms an addition compound with the nitrosyl chloride, that improvement which comprises continuously circulating a concentrated aqueous acidic solution of said metal chloride in a cyclic system in which the solution is directly contacted in one stage with a gas containing nitrosyl chloride at a temperature at which the nitrosyl chloride is absorbed in the solution and forms an addition compound with said metal chloride and in another stage separate from the first the solution is heated to evolve nitrosyl chloride absorbed from said gas, and the resulting solution of metal chloride containing free hydrochloric and nitric acids is returned to renewed contact with said gas containing nitrosyl chloride.

8. In a process for absorption of nitrosyl chloride and reaction of the nitrosyl chloride with a metal chloride which forms an addition compound with the nitrosyl chloride, that improvement which comprises continuously circulating a concentrated acidic aqueous solution of said metal chloride in a cyclic system in which the solution is directly contacted in one stage with a gas containing nitrosyl chloride at a temperature of about 25° C. or lower, thereby absorbing in said solution the nitrosyl chloride with the formation of an addition compound of the nitrosyl chloride and metal chloride, and in another stage separate from the first the solution is heated at 50° C. or higher to evolve nitrosyl chloride absorbed from said gas, and the resulting solution of metal chloride containing free hydrochloric and nitric acids is returned to renewed contact at about 25° C. or lower with said gas containing nitrosyl chloride.

9. The process for the separation and recovery of nitrosyl chloride from a gas containing the same and chlorine which comprises passing said gas in countercurrent flow and in direct contact with an acidic solution of ferric chloride at a temperature at which the ferric chloride reacts with the nitrosyl chloride to form ferric nitrosyl chloride, withdrawing the resulting solution of ferric nitrosyl chloride from contact with said gas, heating the withdrawn solution to evolve nitrosyl chloride therefrom and then cooling the thus heated solution and returning the cooled solution containing free hydrochloric and nitric acids into direct contact with said gas.

HERMAN A. BEEKHUIS, Jr.